(12) United States Patent
Talbot

(10) Patent No.: US 7,698,237 B2
(45) Date of Patent: Apr. 13, 2010

(54) INTERACTIVE COURSE OF ACTION ANALYSIS TOOL USING CASE BASED INJECTED GENETIC ALGORITHM

(75) Inventor: Patrick J. Talbot, Colorado Springs, CO (US)

(73) Assignee: Northrop Grumman Corporation, Los Angeles, CA (US)

(*) Notice: Subject to any disclaimer, the term of this patent is extended or adjusted under 35 U.S.C. 154(b) by 26 days.

(21) Appl. No.: 11/062,508

(22) Filed: Feb. 22, 2005

(65) Prior Publication Data
US 2006/0190420 A1 Aug. 24, 2006

(51) Int. Cl.
*G06N 3/12* (2006.01)
(52) U.S. Cl. ........................... 706/13; 706/45
(58) Field of Classification Search .................. 706/13
See application file for complete search history.

(56) References Cited

U.S. PATENT DOCUMENTS

| 5,404,516 | A | 4/1995 | Georgiades et al. | 395/60 |
|---|---|---|---|---|
| 6,460,049 | B1 | 10/2002 | Becker et al. | 707/104 |
| 6,463,460 | B1 | 10/2002 | Simonoff | 709/203 |
| 6,480,194 | B1 | 11/2002 | Sang'udi et al. | 345/440 |
| 6,497,169 | B1 | 12/2002 | Khosla | 89/1.11 |
| 6,567,814 | B1 | 5/2003 | Bankier et al. | 707/101 |
| 6,687,606 | B1 | 2/2004 | Moitra et al. | 701/202 |
| 6,718,261 | B2 | 4/2004 | Mattheyses et al. | 701/202 |
| 6,735,596 | B2 | 5/2004 | Corynen | 707/102 |
| 2002/0073101 | A1 | 6/2002 | Stoyen | 707/104.1 |
| 2002/0169658 | A1 | 11/2002 | Adler | 705/10 |
| 2004/0019575 | A1 | 1/2004 | Talbot et al. | 706/46 |
| 2004/0193582 | A1* | 9/2004 | Smyth | 707/3 |
| 2006/0004683 | A1* | 1/2006 | Talbot et al. | 706/59 |

FOREIGN PATENT DOCUMENTS

JP 11065416 A1 3/1999

OTHER PUBLICATIONS

Gonsalves, P., Burge, J., and Harper, K. (2003) "Architecture for Genetic Algorithm-Based Threat Assessment," 6th International Conference on Information Fusion, Cairns, Australia, 2003.*

(Continued)

*Primary Examiner*—David R Vincent
*Assistant Examiner*—Lut Wong
(74) *Attorney, Agent, or Firm*—Tarolli, Sundheim, Covell & Tummino LLP

(57) ABSTRACT

Systems and methods are provided for generating and evaluating a plurality of courses of action (COAs) for a problem of interest having an associated set of problem characteristics. A case based reasoner generates an initial set of courses of action according to the associated problem characteristics. Each course of action includes a plurality of COA packages and a set of associated fitness parameters. A genetic algorithm refines the initial set of courses of action according to a set of global influence values to produce at least one optimized course of action. A user interface allows a user to adjust at least one value from the set of global influence values and the set of fitness parameters associated with each optimized course of action.

18 Claims, 3 Drawing Sheets

OTHER PUBLICATIONS

Gonsalves, P., and Burge, J. (2004) "Software Toolkit for Optimizing Mission Plans (STOMP)," The AIAA 1st Intelligent Systems Technical Conference, Chicago, IL (September).*

Patrick J. Talbot ("Semantic Networks: A Unifying Framework for Multistrategy Reasoning" Technology Review Journal 2003).*

Dennis R. Ellis ("Offensive/Defensive Mission Planning: Detailed Plan Optimization Using Genetic Algorithm" Technology Review Journal 2001).*

Connie Loggia Ramsey, John J. Grefenstette "Case-based Anytime Learning" 1994 http://citeseer.ist.psu.edu/17610.html.*

Sushil Louis., Gan Li {"Combining Robot Control Strategies Using Genetic Algorithms with Memory" 1997).*

Grech et al ("Case-Base Injection Schemes to Case Adaptation Using Genetic Algorithms" ECCBR 2004).*

* cited by examiner

INTERACTIVE COURSE OF ACTION ANALYSIS TOOL USING CASE BASED INJECTED GENETIC ALGORITHM

TECHNICAL FIELD

The present invention relates to assisted decision making applications and, more particularly, to an interactive tool for generating courses of action for a given problem.

BACKGROUND OF THE INVENTION

In the past, decisions frequently had to be made on minimal amounts of available data. Information traveled slowly, and what information was available could be considered by a human mind. Frequently, the greatest problem facing a decision maker was a paucity of information. Advances in information gathering and transmittal technologies have reversed this trend, making it easier to gather large amounts of information pertaining to a particular problem. A major task facing modern day decision makers is filtering and organizing the received information into a useful form.

While automated classification and decision making systems have become increasingly sophisticated, the human mind still outperforms automated systems on most real-world tasks. A limitation of human decision making, however, is the inability of human beings to simultaneously consider a large number of factors. Decision makers often find it difficult to mentally combine large amounts of evidence. Since the human tendency is to postpone risky decisions when data is incomplete, some decision makers may, when faced with overwhelming amounts of data, jump to conclusions, or refuse to consider a suitably diverse set of options. Accordingly, automated methods of generating and evaluating a plurality of courses of action for a given problem can greatly aid human decision makers by narrowing the scope of data to be considered.

SUMMARY OF THE INVENTION

In accordance with one aspect of the invention, an assisted decision making system is provided for generating and evaluating a plurality of courses of action (COAs) for a problem of interest having an associated set of problem characteristics. A case based reasoner generates an initial set of courses of action according to the associated problem characteristics. Each course of action includes a plurality of COA packages and a set of associated fitness parameters. A genetic algorithm refines the initial set of courses of action according to a set of global influence values to produce at least one optimized course of action. An optimal solution is defined as one that meets user-selected end-state conditions on metrics. Hence, more than one optimal solution may be found. A user interface allows a user to adjust at least one value from the set of global influence values and the set of fitness parameters associated with each optimized course of action.

In accordance with another aspect of the invention, a computer readable medium contains computer executable instructions for generating and analyzing a plurality of courses of action (COAs) for a problem of interest having an associated set of problem characteristics. A computational engine includes a case based reasoning algorithm that generates an initial set of courses of action according to the associated problem characteristics. Each course of action comprises a plurality of COA packages and a set of associated fitness parameters. The computational engine further includes a genetic algorithm that refines the initial set of courses of action according to a set of global influence values to produce at least one optimized course of action. A user interface allows a user to alter decision parameters and global influence values within the at least one optimized course of action.

In accordance with yet another aspect of the invention, a method is provided for generating and evaluating a plurality of courses of action for a problem of interest. An initial generation of courses of action is generated via analogical reasoning. The courses of action are evaluated for fitness according to associated fitness parameters and global influence values to obtain an overall fitness value for each course of action. New generations of courses of action are iteratively generated from the initial generation of courses of action via genetic operators and evaluated until a termination condition is achieved. At least one course of action from the initial generation and the new generations is selected according to associated overall fitness values of the courses of action.

DETAILED DESCRIPTION OF INVENTION

The present invention relates to systems and methods for generating, refining, and analyzing a plurality of available courses of action in a manner easily comprehensible to a human being. The present invention has broad applicability to decision making in circumstances where planning goals are incompletely specified and the search space is too large to search exhaustively. The present invention generates a course of action for a given problem based on analogical reasoning from past courses of action. A given course of action comprises a plurality of paired actions and targets, with associate attributes, referred to collectively as packages. The courses of action are then optimized according to decision parameters set by a human operator. Optimization of the courses of action can include adding, removing, or altering the content of the packages comprising the courses of action. The values of the decision parameters can be edited by a user to produce real time updates to the optimized courses of action as well as fitness values associated with the courses of action. This allows a user to immediately see the impact of any change of the influence values.

It will be appreciated that the present invention can be employed in any decision making applications in which multiple courses of action are considered. The systems and methods of the present invention can be applied to applications ranging from high-level government policy to procurement decisions in a small business. Thus, while the exemplary embodiments illustrated within this application focus on military and defense applications, the present invention can be applied in other fields, such as industrial processes, design work, research, and corporate management.

Figure 1:
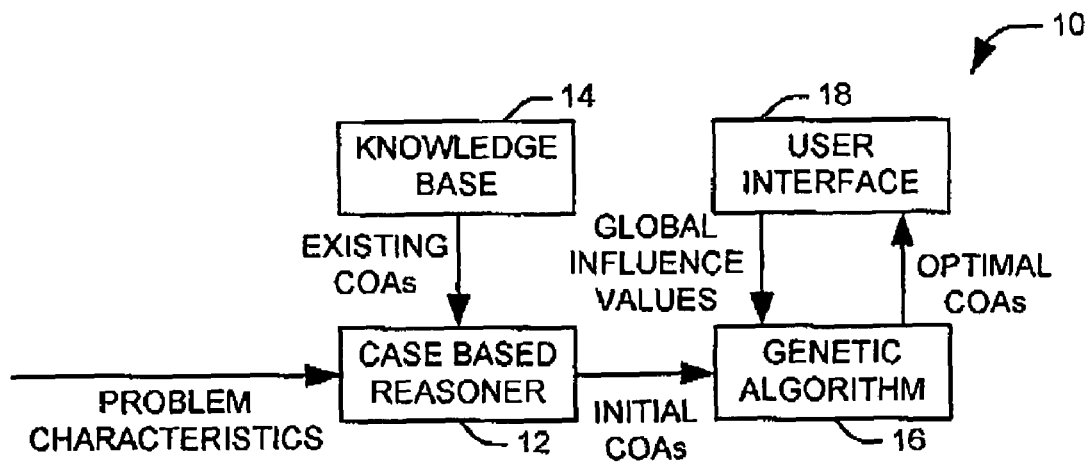
FIG. 1 illustrates a system for generating and evaluating a plurality of available courses of action.

FIG. 1 illustrates a system 10 for generating and evaluating a plurality of available courses of action. A given course of action includes a plurality of packages, with a given package comprising an action and a target of the action. The illustrated system 10 generates a set of optimal courses of action for a given problem based upon the characteristics of the problem and a plurality of decision parameters determined by a user. A set of problem characteristics can be provided to a case based reasoner 12. The case based reasoner 12 generates a plurality of courses of action according to the problem characteristics. For example, the case based reasoner 12 can construct a plurality of courses of action based upon courses of action constructed for previous problems having similar characteristics, stored in an associated knowledge base 14. Packages from successful or favorably rated courses of action can be adopted and packages from unsuccessful or unfavorably rated courses of action can be avoided.

The generated courses of action are optimized via a genetic algorithm 16 according to a plurality of global influence values. These global influence values can be defined by a user via a user interface 18. The genetic algorithm 16 generates new courses of action via genetic operators, such as crossover and mutation, and evaluates the newly generated courses of action for fitness according to the global influence values. The courses of action having the best fitness are retained, and another generation of courses of action is produced by the genetic operators. This can continue until a termination event occurs, such as a set number of generations or a threshold fitness value. The resulting courses of action can be provided to a user for review at the user interface 18.

In accordance with an aspect of the present invention, the user can edit the courses of action through the user interface 18. For example, packages can be added, removed, or altered within a course of action to allow the user to see the importance of individual actions and targets within the course of action. The fitness parameters and fitness value of the altered course of action can be recalculated to show the effects of the user's editing. Fitness parameters associated with a given cause of action and global influence values can also be changed to determine the sensitivity of the courses of action to these values. The fitness values associated with each of the courses of action are recalculated in real time using the new fitness parameters and global influence values. The user can also request that one or more new courses of action be generated at the genetic algorithm 16 using the new global influence values. Accordingly, the user can maintain optimal courses of action despite changing information about the problem of interest or changes in priorities for managing resources.

Figure 2:
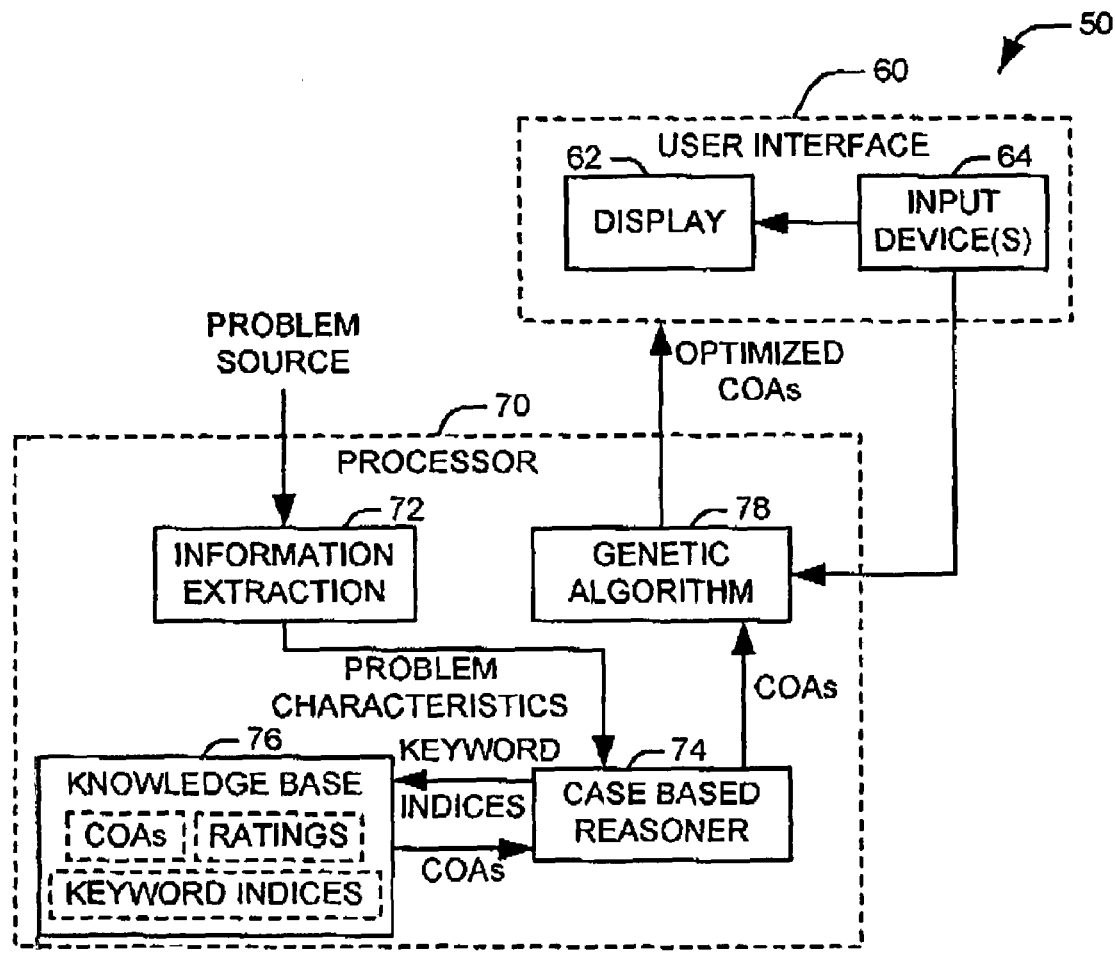
FIG. 2 illustrates an exemplary implementation of a system for in accordance with an aspect of the present invention.

FIG. 2 illustrates an exemplary implementation of a course of action generator 50 for in accordance with an aspect of the present invention. The course of action generator 50 generates a set of at least one optimized course of action for a given problem according to a plurality of global influence values. A given course of action includes a plurality of actions, with each action having an associated target. An action-target pair is referred to herein as a package. The illustrated course of action generator 50 comprises a user interface 60, comprising a display 62 and at least one input device 64, and a processor 70. The processor 70 can comprise a general purpose computer, a dedicated microprocessor, or a similar data processing device. It will be appreciated that the components 72, 74, 76, and 78 illustrated within the processor 70 can be implemented as software programs or as dedicated hardware within the processor.

A problem source is received at an information extraction component 72. The problem source can comprise a digitized text document, in the form of a scanned image or a formatted electronic document. Where the problem source is provided as a scanned image, the information extraction component 72 can include optical character recognition routines for extracting text from a scanned document. The information extraction component 72 parses the text from the problem source and extracts key words and phrases from the parsed text. The extracted key words and phrases are then used to create a template formatted for input into an associated case based reasoner 74. A set of index values is then assigned to the problem template. The index values can be entered by a user upon reviewing the template, or can be generated independently by the information extraction component 72.

In an exemplary implementation, the information extraction component 72 can look for details relating to an event described in the document, such as the nature of the event, the cause or motivation for the event, the mechanism of the event, the identity of an actor, the location of the event, the time or date of the event, and the magnitude of the event. Each of these details can be added to a template related to the document. The information extraction component 72 can look for hedge words (e.g., maybe, probably, certainly, never) within the text segment. The information extraction component 72 can use a co-referencing routine to determine what nouns relate to a given hedge word. For example, in a military application, the presence of keywords such as "nuclear" and "biological" might increase a "non-conventional threat" index associated with the problem. The effect of the keywords words can be determine from any associated hedge words, with words like "rarely" and "possibly" lowering the effect of a given key word and words like "certainly" or "likely" increasing the effects of a given key word. Similarly, the context of a given key word can govern its effect on various indices. For example, the word "plane" can be associated with the location, mechanism, motivation, or nature of an event, with each having different implications for the indices associated with the problems.

Once the template and associated indices for the problem have been established, they are provided to the case based reasoner 74. The case based reasoner 74 generates a set of courses of action based upon past courses of action associated with similar problems that are stored in an associated knowledge base 76. The similarity of the input problem to a previous problem can be determined according to the index values determined for the input problem and the stored index values associated with a given course of action. For example, a weighted sum of the differences between the input problem index values and each stored course of action can be computed, and a plurality of stored courses of action associated with similar problems can be retrieved. Alternatively, similar courses of action can be refined or evolved via an appropriate optimization routine.

In an exemplary implementation, each package in a given course of action can be defined as an ordered pair of two integers, with the first integer representing a possible action or effect in the knowledge base and the second integer representing a potential target in the knowledge base. Each action has a plurality of associated parameters, representing characteristics of the response. For example, in a military planning application, the parameters can include weapon type (e.g., conventional, nuclear, biological), the arena in which the action takes place (e.g., strategic or theater), the type of action (e.g., preemptive strike on the target, defense of the target, destruction of the target), the exchange ratio expected for a given action, and a plurality of factors comprising the exchange ratio. The exchange ratio of an action on a class of targets is the ratio of the likelihood that the actor will accomplish its objectives to the likelihood that an opposing actor will accomplish its objectives, if the action is taken. In an exemplary military implementation, the likelihood of each actor accomplishing its objectives is based on a number of probability values associated with the action, including the pre-launch survivability of each actor's forces involved in the action, the probability that the forces will arrive at a target, and the probability that opposing forces will be damaged. These probability values can be stored as parameters associated with the target.

Similarly, each of the plurality of targets can have associated parameters. For example, the target can have an associated latitude and longitude, a population density, an error radius, defining the precision needed to hit the target, associated weather conditions, a hardness, defining the target's resistance to attack, a priority, a set of collateral effects expected in an attack on the target, a mobility, and an associated target class that defines the general nature of the target. These target characteristics, in combination with the characteristics of the actions, can be used to determine the similarity of a given plan of action to existing plans of action within the knowledge base 76.

The retrieved courses of action are provided to a genetic optimization algorithm 78. The genetic algorithm 78 refines the provided set of courses of action to provide one or more optimal courses of action according to a set of global influence values provided by the user. The genetic algorithm 78 produces a new generation of courses of action based on the original data sets via one or more genetic operators, such as crossover and mutation. For example, in a mutation operation, one package in a course of action can be exchanged for another, randomly selected, package from the knowledge base 76. Similarly, in a crossover operation between two courses of action, a third course of action comprising a combination of packages from a first course of action and a second course of action can be generated.

Each new course of action is evaluated according to a plurality of global influence values to determine the desirability of the course of action. The global influence values for the genetic algorithm 78 can be provided by the user via the input device 64. The new courses of action are then compared to existing courses of action to determine a new generation comprising the courses of action that are the most desirable. The genetic operators can then be applied to this generation to form a new generation, with the process continuing until a termination event occurs. For example, the genetic algorithm 78 can continue for a predetermined number of iterations, for a predetermined period of time, or until a threshold level of fitness has been achieved.

In an exemplary implementation, the genetic algorithm 78 utilizes a fitness function comprising four fitness parameters, which are derived from the characteristics of a given course of action and those of its associated packages, to produce optimized courses of action. Each of these global characteristics is weighted by global influence values provided by the user to determine an overall fitness for a given course of action. A first fitness parameter is generated according to the qualitative similarities between the course of action and the original problem source. For example, a word matching algorithm can be used to generate a numerical similarity score for each course of action based on the content of its associated packages.

A second parameter is the expected effectiveness of the action. This can be calculated according to a plurality of quantitative parameters associated with the packages comprising a course of action. For example, the quantitative parameters can include the population density of the target, the likelihood of collateral damage, the hardness of the target, and a determined priority value of the target. A third parameter is the number of packages associated for a given course of action. A global influence value assigned by the user determines a threshold number of packages desired in a given course of action. A penalty can be assigned in the optimization function for each package exceeding the defined value. Depending on the desired application, this penalty can range from a relatively small penalty to discourage overly complex and expensive courses of action to a relatively large penalty that effectively removes courses of action exceeding the package threshold from consideration.

A fourth parameter is an overall exchange ratio for the course of action. As discussed above, each package has an exchange ratio and a set of exchange rate factors based on its associated action. In the illustrated implementation, the exchange ratio for a course of action is calculated according to a combination rule, where probability values associated with multiple actions on the same target are combined to produce overall probability values for the target. In accordance with the combinational rule, related actions, which are actions with factors representing dependent probabilities, that are associated with a given target are combined multiplicatively, according to a logical AND rule, such that the combined probability is equal to $p_1 * p_2 * \ldots * P_n$ when $p_i$ is the $i^{th}$ dependent probability for a given target. Unrelated actions, or actions having associated factors that represent independent probability values, that are associated with a given target are combined according to a logical OR rule, where the combined probability is equal to the difference between one and the product of the reciprocals of the individual probabilities, such that the combined probability is equal to $[1-(1-p_1)*(1-p_2)*\ldots*(1-p_n)]$.

Once a set of overall probabilities has been determined for each target, each target is assigned a weight according to a predetermined priority for each target. The weight for each target is determined according to the ratio of a target's priority value to the combined priority value for the plurality of targets, such that the weight for a given target is equal to $P_i/(P_1+P_2+\ldots+P_n)$, where $P_i$ is the priority value for the $i^{th}$ target. The probabilities associated with each target are then apportioned according to the determined weight values to form a set of total probability values for the course of action. From these total values, an overall exchange ratio can be calculated for the course of action as the ratio of the product of the probability values representing favorable factors over the product of the probability values representing unfavorable factors.

Once the genetic algorithm 78 has terminated, the optimized courses of action can be displayed to a user at the display 62. The user can edit the displayed courses of action directly via the input device 64 to add, remove, or alter packages within a given course-of action. Alternatively, the user can alter the global influence values associated with the genetic algorithm 78 and request the generation of additional optimized courses of action based on the new global influence values. For example, the importance of the exchange ratio and the threshold number of packages can be raised by a user to seek solutions having superior relative impact for the actor at the cost of increased complexity.

Figure 3:
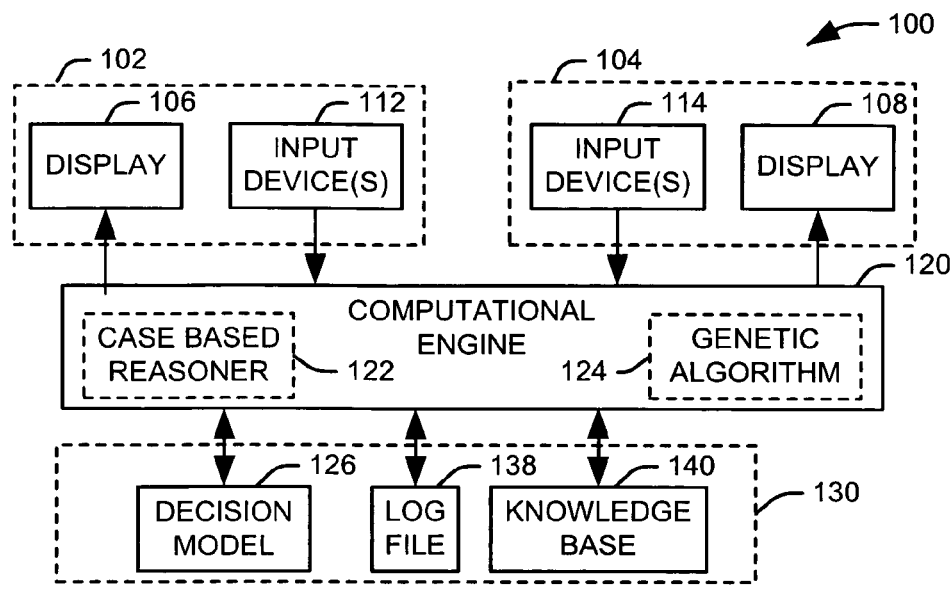
FIG. 3 illustrates an exemplary system for collaborative construction and evaluation of a plurality of courses of action for addressing a problem of interest in accordance with one or more aspects of the present invention.

FIG. 3 illustrates an exemplary system 100 for collaborative construction and evaluation of a plurality of courses of action for addressing a problem of interest in accordance with one or more aspects of the present invention. The illustrated system 100 allows multiple users to access a shared knowledge base to construct and manipulate courses of action for addressing the problem of interest. The system 100 comprises a plurality of user interfaces 102 and 104 that allow users to view and edit courses of action. It will be appreciated that the user interfaces 102 and 104 can be located remotely from the other components of the system 100 and from one another. The user interfaces 102 and 104 can each comprise a display 106 and 108 and one or more input devices 112 and 114. For example, users can utilize an input device (e.g., 112) to provide commands to a computational engine 120.

The computational engine 120 is operative to generate one or more courses of action via a case based reasoning algorithm 122, and optimize the generated courses of action according to user provided influence values via a genetic algorithm 124. The optimized set of courses of action form a decision model 126 for the problem of interest, which is stored in a shared system memory 130. Once the decision model has been constructed, any authorized user on the system can instruct the computational engine 120 to edit parameters or packages associated with one or more of the courses of action, and the global influence values associated with the decision model.

When the packages or parameters comprising a given course of action are changed, the computational engine 120 updates the fitness of the altered courses of action within the model according to the global influence parameters. In one implementation, the fitness of each course of action is determined as a weighted average of a subset of the fitness parameters. The weights for the fitness parameter can be determined from the global influence values. For example, a given weight can be determined as the ratio of a given influence value to the sum of all the influence values associated with the subset of fitness parameters. Other fitness parameters associated with the course of action can modify this value according to an unweighted formula based on their associated influence values. For example, a standard penalty can be accessed to the fitness of a course of action for exceeding a threshold number of packages defined by one of the global influence values.

The updated fitness values can stored in the system memory 130. Qualitative aspects of the model 126 can also be changed in response to the changed parameters. For example, the color, brightness, or line thickness of a box associated with a course of action can be changed to reflect an updated fitness value. In addition, a log file 138 associated with the decision model 126 can be updated to reflect the change of a global influence value or a decision parameter. The log file 138 can contain a record of each parameter change, the time and date of the change, the identity of the user making the change, and a rationale for the change. This allows a collaborative review of the decision model 126 by a number of experts while maintaining accountability for changes to the model.

In accordance with an aspect of the present invention, the user can provide a new set of global influence values to the decision model 126 via an input device (e.g., 112) and instruct the computational engine 120 to generate new courses of action based upon a new set of global influence values. The computational engine 120 can produce the new courses of action according to the genetic algorithm 124 utilizing the revised optimization criteria and display them to the user at the user's display (e.g., 106). The user can also add, remove, or edit one or more tasks associated with a course of action through the user interface (e.g., 102). The decision parameters associated with the amended course of action can be altered in response to these changes. To assist with building a decision model, previous decision models, containing related courses of action, can be retrieved from the knowledge base 140 and displayed at the user's display (e.g., 106). It will be appreciated that at any time, the system is used by a plurality of users, and that decision models constructed by any user, past or present, can be stored within the system memory 130. Accordingly, the experience of a large number of users can be drawn upon through the stored models.

Figure 4:
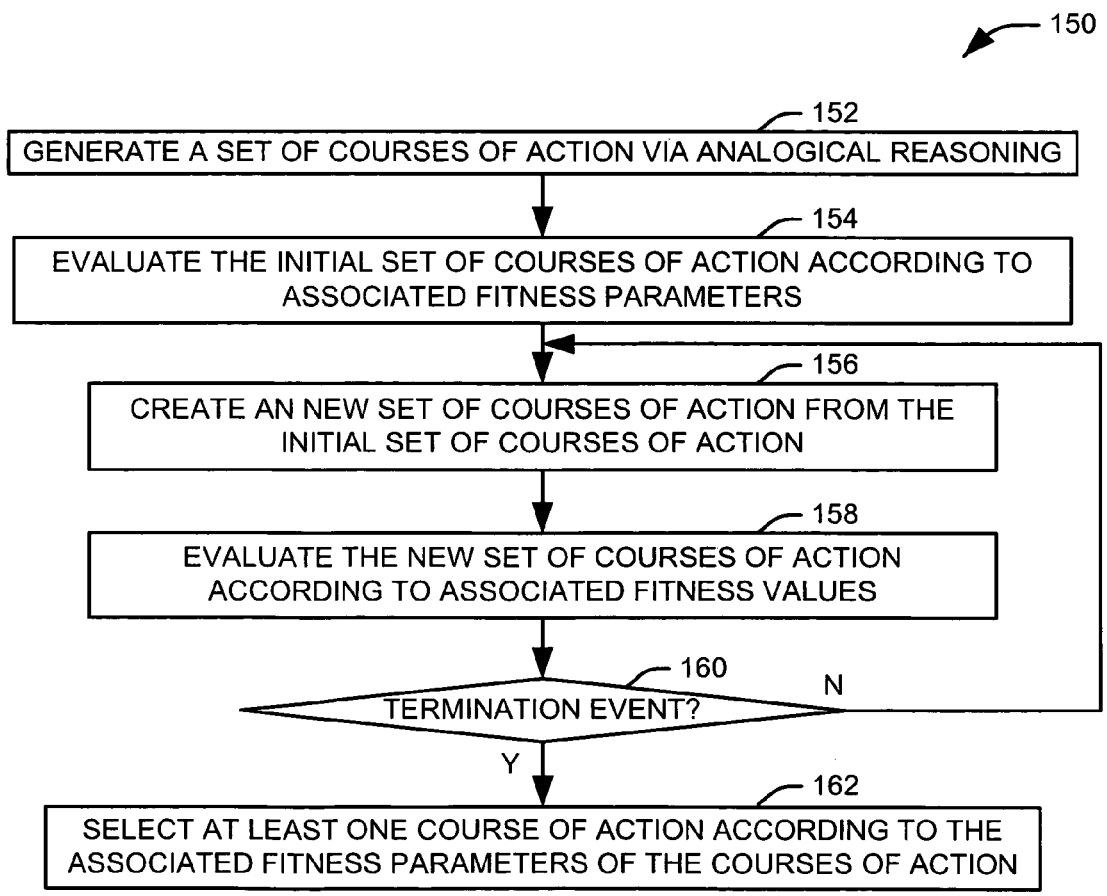
FIG. 4 illustrates a methodology for producing a plurality of optimized courses of action.

In view of the foregoing structural and functional features described above, methodologies in accordance with various aspects of the present invention will be better appreciated with reference to FIG. 4. While, for purposes of simplicity of explanation, the methodologies of FIG. 4 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

FIG. 4 illustrates a methodology 150 for producing a plurality of optimized courses of action. The methodology 150 begins at 152, wherein a set of courses of action is generated according to analogical reasoning algorithm. Each course of action comprises a plurality of packages, which are paired actions and action targets. For example, if the course of action addresses a problem of a chess match, the action might include moving a piece two spaces forward, and the associated target could be a white pawn. It will be appreciated that the actions are generic, such that they can be applied to any of a number of targets. Characteristics of the problem can be provided to an analogical reasoner (e.g., a case based reasoner). The analogical reasoner can search an associated database that contains courses of action generated for previous problems and select a set of courses of action that have been generated for problems having characteristics similar to those of the problem of interest.

At 154, these courses of action are evaluated for fitness. Each of the courses of action has an associated set of fitness parameters. An overall fitness score for each course of action can be determined as a function of the fitness parameters associated with the course of action and a corresponding set of global influence values associated with the problem. In one example, the function for computing the overall fitness score includes a weighted sum of a subset of the fitness parameters, wherein the weights for the weighted sum are determined by the corresponding global influence value for each of the fitness parameters within the subset.

At 156, a new set, or generation, of courses of action is generated from the initial set of courses of action. A new generation of courses of action can be generated by applying genetic operators to the previous generation of courses of action. For example, a new course of action can be produced via mutation, where one package in a course of action is exchanged for a randomly selected package. Alternatively, new courses of action can be produced via crossover, where portions of two courses of action are combined to form a new course of action. Once a new set of courses of action has been generated, they are evaluated at 158. Fitness values are calculated for all available courses of action, and the courses of action having the highest fitness values are retained for the next generation.

At 160, it is determined if a predetermined termination condition has been achieved. For example, the termination condition can be the generation and evaluation of a threshold number of generations, the achievement of a threshold fitness value, or the passage of a period of time. If the termination condition has not been achieved, the methodology 150 returns to 156 to generate a new generation of courses of action from the most recent generation. If the termination condition has been achieved, the methodology 150 advances to 162, where at least one course of action is selected according to the fitness values. For example, a set of three courses of action having the largest fitness values can be selected.

Once a set of courses of action have been selected, a user can edit the courses of action through an associated user interface. The fitness values of the selected courses of action can be recalculated to show the effects of the user's editing. For example, the user can change one or more fitness parameters associated with a given cause of action to reflect new information about the course of action or the actions and targets represented by its associated packages. The fitness value associated with the course of action can then be recalculated with the new fitness parameters to illustrate the effect of the change to the user. Similarly, the user can change one or more global influence values associated with the problem to reflect changing priorities for the course of action. The fitness values associated with each of the courses of action can then be recalculated using the new global influence values to illustrate the effect of the change to the user. Accordingly, the user can determine the sensitivity of the fitness values to changes in the underlying assumptions used in generating the courses of action.

Figure 5:
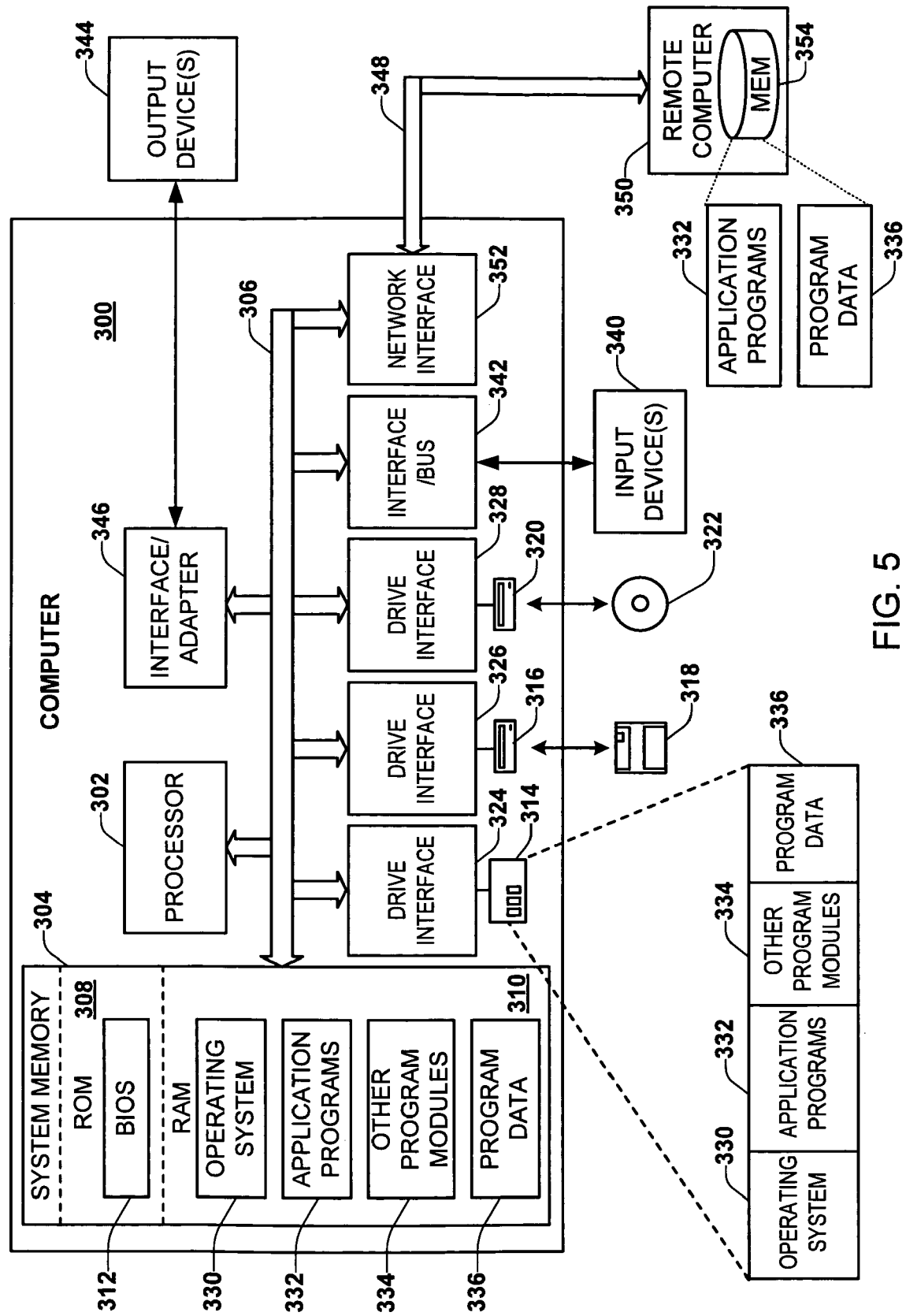
FIG. 5 illustrates a computer system that can be employed to implement systems and methods described herein.

FIG. 5 illustrates a computer system 300 that can be employed to implement systems and methods described herein, such as based on computer executable instructions running on the computer system. The computer system 300 can be implemented on one or more general purpose networked computer systems, embedded computer systems, routers, switches, server devices, client devices, various intermediate devices/nodes and/or stand alone computer systems. Additionally, the computer system 300 can be implemented as part of the computer-aided engineering (CAE) tool running computer executable instructions to perform a method as described herein.

The computer system 300 includes a processor 302 and a system memory 304. A system bus 306 couples various system components, including a coupling of the system memory 304 to the processor 302. Dual microprocessors and other multi-processor architectures can also be utilized as the processor 302. The system bus 306 can be implemented as any of several types of bus structures, including a memory bus or memory controller, a peripheral bus, and a local bus using any of a variety of bus architectures. The system memory 304 includes read only memory (ROM) 308 and random access memory (RAM) 310. A basic input/output system (BIOS) 312 can reside in the ROM 308, generally containing the basic routines that help to transfer information between elements within the computer system 300, such as a reset or power-up.

The computer system 300 can include a hard disk drive 314, a magnetic disk drive 316, (e.g., to read from or write to a removable disk 318), and an optical disk drive 320, (e.g., for reading a CD-ROM or DVD disk 322 or to read from or write to other optical media). The hard disk drive 314, magnetic disk drive 316, and optical disk drive 320 are connected to the system bus 306 by a hard disk drive interface 324, a magnetic disk drive interface 326, and an optical drive interface 334, respectively. The drives and their associated computer-readable media provide nonvolatile storage of data, data structures, and computer-executable instructions for the computer system 300. Although the description of computer-readable media above refers to a hard disk, a removable magnetic disk and a CD, other types of media which are readable by a computer, may also be used. For example, computer executable instructions for implementing systems and methods described herein may also be stored in magnetic cassettes, flash memory cards, digital versatile disks and the like.

A number of program modules may also be stored in one or more of the drives as well as in the RAM 310, including an operating system 330, one or more application programs 332, other program modules 334, and program data 336.

A user may enter commands and information into the computer system 300 through user input device 340, such as a keyboard or a pointing device (e.g., a mouse). Other input devices may include a microphone, a joystick, a game pad, a scanner, a touch screen, or the like. These and other input devices are often connected to the processor 302 through a corresponding interface or bus 342 that is coupled to the system bus 306. Such input devices can alternatively be connected to the system bus 306 by other interfaces, such as a parallel port, a serial port or a universal serial bus (USB). One or more output device(s) 344, such as a visual display device or printer, can also be connected to the system bus 306 via an interface or adapter 346.

The computer system 300 may operate in a networked environment using logical connections 348 to one or more remote computers 350. The remote computer 348 may be a workstation, a computer system, a router, a peer device or other common network node, and typically includes many or all of the elements described relative to the computer system 300. The logical connections 348 can include a local area network (LAN) and a wide area network (WAN).

When used in a LAN networking environment, the computer system 300 can be connected to a local network through a network interface 352. When used in a WAN networking environment, the computer system 300 can include a modem (not shown), or can be connected to a communications server via a LAN. In a networked environment, application programs 332 and program data 336 depicted relative to the computer system 300, or portions thereof, may be stored in memory 354 of the remote computer 350.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. An assisted decision-making system that generates and evaluates a plurality of courses of action (COAs) for a problem of interest having an associated set of keyword indices that represent the problem of interest, the system comprising:
   a processor for accessing a memory and computer executing executable instructions stored on the memory; and
   a memory comprising executable instructions, the executable instructions comprising:
      a knowledge base comprising a plurality of courses of action associated with previous problems, each previous problem having an associated set of keyword indices and each course of action comprising a plurality of COA packages, a set of associated fitness parameters, and a rating indicating a degree of success associated with each course of action when applied to its associated problem;
      a case based reasoner that generates each of an initial set of courses of action according to a determined similarity between the set of keyword indices associated with the problem of interest and respective sets of keyword indices representing the previous problems associated with the plurality of courses of action and the associated ratings of the courses of action;

a genetic algorithm that refines the initial set of courses of action, according to a set of global influence values, to produce at least one optimized course of action; and a user interface that alters a visual display as to present the at least one optimized course of action to a user and allows a user to adjust at least one value from the set of global influence values and the set of fitness parameters associated with each optimized course of action, wherein each keyword of the keyword indices comprises one of a word and a phrase extracted from a text document;

wherein the set of associated fitness parameters comprising:

an overall exchange ratio that defines a ratio of likelihood that an actor will accomplish its objectives to a likelihood that an opposing actor will accomplish its objectives, if the course of action is taken; and an effectiveness of the course of action that defines the expected effectiveness the course of action provides, if the course of action is taken.

2. The system of claim 1, the genetic algorithm configured to produce a new set of at least one optimized courses of action in response to an adjustment of the values of at least one of the plurality of global influence values by the user.

3. The system of claim 1, wherein each of the plurality of COA packages comprises a target and an action, the target being defined by a first plurality of parameters, the first plurality of parameters comprising the location of the target and at least one of an error radius that defines the precision necessary to hit the target, a hardness, defining the targets resistance to attack, and a mobility associated with the target.

4. The system of claim 3, the action being defined by a second plurality of parameters, the second plurality of parameters comprising a general type of action and at least one of a weapon type and an exchange ratio expected for the action.

5. The system of claim 1, wherein each of the plurality of packages associated with a given course of action comprises at least one associated fitness parameter and the genetic algorithm including a combinational rule for combining the fitness parameters associated with the plurality of packages into corresponding global fitness parameters associated with the course of action.

6. The system of claim 1, wherein the set of associated fitness parameters further comprises a value indicating the similarity of a set of key words associated with the course of action to a set of key words associated with the problem of interest.

7. The system of claim 1, the memory further comprising an information extraction component that extracts the problem characteristics from a source document associated with the problem of interest, and creates a template from the problem characteristics that is formatted for input to the case based reasoner, the template comprising fields for at least one of the cause of an event, the location of the event, and the identity of an actor associated with the event.

8. The system of claim 7, the information extraction component further comprising a coreferencing routine that matches words from the source document indicating confidence in a statement with nouns within the fields of which the template is comprised.

9. A computer readable medium having computer executable instructions that can be executed on a processor to generate and analyze a plurality of courses of action (COAs) for a problem of interest having an associated set of keyword indices, the computer executable instructions comprising:

a knowledge base stored in memory comprising a plurality of courses of action associated with previous problems, each previous problem having an associated set of keyword indices and each course of action comprising a plurality of COA packages and a set of associated fitness parameters;

an information extraction component that extracts data from a source document associated with the problem of interest, and creates a template from the problem characteristics that is formatted for input to the case based reasoner, the template comprising fields for at least one of the cause of an event, the location of the event, and the identity of an actor associated with the event;

a computational engine, comprising:

a case based reasoning algorithm that generates each of an initial set of courses of action from the plurality of courses of action of the knowledge base according to a determined similarity between the set of keyword indices associated with the problem of interest and respective sets of keyword indices representing the previous problems associated with the plurality of courses of action; and a genetic algorithm that refines the initial set of courses of action, according to a set of global influence values, to produce at least one optimized course of action; and a user interface that alters a visual display as to present the at least one optimized course of action to a user and allows the user to alter decision parameters and global influence values within the at least one optimized course of action wherein the set of associated fitness parameters comprising:

an overall exchange ratio that defines a ratio of likelihood that an actor will accomplish its objectives to a likelihood that an opposing actor will accomplish its objectives, if the course of action is taken; and an effectiveness of the course of action that defines the expected effectiveness the course of action provides, if the course of action is taken.

10. The computer readable medium of claim 9, the plurality of stored courses of action of the knowledge base having an associated rating indicating a degree of success associated with each course of action when applied to its associated problem, the case based reasoner selecting the initial courses of action from the plurality of courses of action comprising the knowledge base at least in part according to their associated ratings.

11. The computer readable medium of claim 9, the set of associated fitness parameters further comprising a value indicating the similarity of a set of key words associated with a given course of action to a set of key words associated with the problem of interest.

12. The computer readable medium of claim 9, the computational engine configured to change the packages comprising a given optimized course of action and calculate new fitness parameters for the optimized course of action in response to user input at the user interface.

13. The computer readable medium of claim 12, further comprising a log file that records any changes to the plurality of global influence values and the fitness parameters associated with each optimized course of action along with the identity of a user responsible for the change.

14. A computer implemented method for generating and evaluating a plurality of courses of action for a problem of interest, comprising:

retrieving a plurality of courses of action from an associated memory, each course of action having an associated previously encountered problem;

generating each of an initial generation of courses of action via analogical reasoning from the retrieved plurality of courses of action according to the similarity of the problem of interest to the respective previously encountered problems associated with the plurality of courses of action;

evaluating the courses of action for fitness according to associated fitness parameters and global influence values to obtain an overall fitness value for each course of action, the associated fitness parameters comprising:

a value indicating the similarity of a set of key words associated with a given course of action to a set of key words associated with the problem of interest, wherein each key word comprises one of a word and a phrase extracted from a text document;

an overall exchange ratio that defines a ratio of likelihood that an actor will accomplish its objectives to a likelihood that an opposing actor will accomplish its objectives, if the course of action is taken; and an effectiveness of the course of action that defines the expected effectiveness the course of action provides, if the course of action is taken;

iteratively generating and evaluating new generations of courses of action from the initial generation of courses of action via genetic operators until a termination condition is achieved;

selecting at least one course of action from the initial generation and the new generations according to associated overall fitness values of the courses of action; and altering a display as to display the selected at least one course of action to a user.

15. The computer implemented method of claim 14, wherein generating each of an initial generation of courses of action comprises selecting the initial courses of action according to a rating indicating a degree of success associated with each course of action when applied to its associated problem.

16. The computer implemented method of claim 14, further comprising:

altering the value of at least one fitness parameter associated with a given selected course of action in response to user input; and calculating a new fitness value for the course of action based on the altered value of the fitness parameter.

17. The computer implemented method of claim 14, further comprising:

altering the value of at least one global influence value in response to user input; and calculating new fitness values for the selected courses of action based on the altered value of the at least one global influence value.

18. The computer implemented method of claim 14, further comprising extracting the set of key words associated with the problem of interest from a source document associated with the problem of interest and creating a template from the problem characteristics that is formatted for input to the case based reasoner, the template comprising fields for at least one of the cause of an event, the location of the event, and the identity of an actor associated with the event.

* * * * *